US010687025B2

(12) United States Patent
Child et al.

(10) Patent No.: US 10,687,025 B2
(45) Date of Patent: Jun. 16, 2020

(54) ANTI-THEFT DOORBELL CAMERA

(71) Applicant: Vivint, Inc., Provo, UT (US)

(72) Inventors: Michael D. Child, Lehi, UT (US);
JonPaul Vega, Highland, UT (US);
Craig Matsuura, Draper, UT (US);
Dean Brederson, Salt Lake City, UT (US)

(73) Assignee: Vivint, Inc., Provo, UT (US)

( * ) Notice: Subject to any disclaimer, the term of this patent is extended or adjusted under 35 U.S.C. 154(b) by 782 days.

(21) Appl. No.: 14/924,579

(22) Filed: Oct. 27, 2015

(65) Prior Publication Data
US 2017/0116835 A1 Apr. 27, 2017

(51) Int. Cl.
| | | |
|---|---|---|
| H04N 7/00 | (2011.01) | |
| H04N 7/18 | (2006.01) | |
| G08B 13/00 | (2006.01) | |
| G08B 13/14 | (2006.01) | |
| G08B 29/04 | (2006.01) | |
| G08B 21/02 | (2006.01) | |
| G08B 3/10 | (2006.01) | |

(52) U.S. Cl.
CPC ............ *H04N 7/183* (2013.01); *G08B 13/00* (2013.01); *G08B 13/1427* (2013.01); *G08B 21/0272* (2013.01); *G08B 29/046* (2013.01); *H04N 7/186* (2013.01); *G08B 3/10* (2013.01); *G08B 13/1409* (2013.01); *G08B 13/1418* (2013.01); *G08B 21/0261* (2013.01)

(58) Field of Classification Search
CPC . H04N 7/18; G08B 29/00; G08B 3/00; G08B 13/00
See application file for complete search history.

(56) References Cited

U.S. PATENT DOCUMENTS

| | | | |
|---|---|---|---|
| 7,667,600 B2 | 2/2010 | Woodbury et al. | |
| 8,314,698 B2 | 11/2012 | Woods | |
| 8,432,448 B2 | 4/2013 | Hassapis et al. | |
| 8,780,201 B1 * | 7/2014 | Scalisi | H04N 7/186 348/143 |
| 8,872,915 B1 | 10/2014 | Scalisi et al. | |
| 2003/0159070 A1 * | 8/2003 | Mayer | G06F 21/53 726/22 |

(Continued)

FOREIGN PATENT DOCUMENTS

JP 2008140370 A 6/2008

OTHER PUBLICATIONS

PCT International Search Report for International Application No. PCT/US2016/055209, dated Jan. 6, 2017 (3 pp.).

*Primary Examiner* — Maryam A Nasri
(74) *Attorney, Agent, or Firm* — Holland & Hart, LLP

(57) ABSTRACT

In some embodiments, security and/or automation systems, collectively referred to as automation system, may provide deterrents to the illicit acquisition of a device unique to the automation system. The system may enable a device to self-detect when the device is either stolen and/or the potential victim of hacking. The automation system may implement several solutions to help prevent tampering with its devices. The solutions may help prevent the physical acquisition of a device or may aid in the recovery of the device. The solutions may additionally include programming the device to automatically detect when the device is being hacked and/or misappropriated.

19 Claims, 8 Drawing Sheets

(56) References Cited

U.S. PATENT DOCUMENTS

| | | | |
|---|---|---|---|
| 2004/0080416 A1* | 4/2004 | Johnson | G08B 13/149 340/568.7 |
| 2011/0314541 A1* | 12/2011 | Svensson | G01R 31/31719 726/21 |
| 2013/0154823 A1 | 6/2013 | Ostrer et al. | |
| 2014/0265359 A1 | 9/2014 | Cheng et al. | |
| 2014/0266669 A1 | 9/2014 | Fadell et al. | |
| 2014/0266674 A1* | 9/2014 | Nye | G08B 29/06 340/507 |
| 2015/0163412 A1 | 6/2015 | Holley et al. | |

* cited by examiner

ANTI-THEFT DOORBELL CAMERA

BACKGROUND

The present disclosure, for example, relates to security and/or automation systems, and more particularly to provide security features to devices associated with the security and/or automation systems.

Security and automation systems are widely deployed to provide various types of communication and functional features such as monitoring, communication, notification, and/or others. These systems may be capable of supporting communication with a user through a communication connection or a system management action.

Some automation and security products may be external to a building. The devices may be susceptible to misappropriation and/or a hostile takeover or altering of the device. The devices may be easily removed from the premises and resold or retrofitted to another automation system. Additionally, the devices may susceptible to software alterations, wherein unsolicited personnel may access the functionality of the device remotely without authorization and/or gain access to other functions of an automation system through the alteration of the device.

SUMMARY

In some embodiments, security and/or automation systems, collectively referred to as automation system, may provide deterrents to the illicit acquisition of a device unique to the automation system. The system may enable a device to self-detect when the device is either stolen and/or the potential victim of hacking. The automation system may implement several solutions to help prevent tampering with its devices. The solutions may help prevent the physical acquisition of a device or may aid in the recovery of the device. The solutions may additionally include programming the device to automatically detect when the device is being hacked and/or misappropriated.

In one embodiment, a method for security and/or automation systems is described. The method may comprise identifying a discrepancy at a doorbell camera associated with an automation system. The method may compare the identified discrepancy with an alteration parameter of the doorbell camera and automatically activate one or more security features based at least in part on the comparing.

In further embodiments, the method may further comprise comparing a current location of the doorbell camera with a location threshold for the doorbell camera. Data may be collected associated with the current location based at least in part on the comparing and the current location of the doorbell camera may be identified based at least in part on the collected data. The identified discrepancy with the alteration parameter of the doorbell camera may further comprise detecting that the doorbell camera is connected to an alternative Wi-Fi network. Comparing the identified discrepancy with the alteration parameter of the doorbell camera may further comprise determining whether the doorbell camera is disconnected from the automation system. In some instances, comparing the identified discrepancy with the alteration parameter of the doorbell camera may further comprise determining whether software used to control the doorbell camera is altered.

In some embodiments, automatically activating one or more security feature based at least in part on the determining further comprises may further comprise disabling one or more features of the doorbell camera. The method may include detecting an outside source attempting to access the one or more disabled features. In some instances, automatically activating one or more security features based at least in part on the determining may further comprise erasing at least a portion of software used to control the doorbell camera.

In some instances, automatically activating one or more security features based at least in part on the determining may further comprise automatically destroying one or more physical features of the doorbell camera after a predetermined time period. In further instances, automatically activating one or more security features based at least in part on the determining may further comprise recording audio and video data captured by the doorbell camera; and sending the audio and video data to a control panel associated with the automation system. In some instances, the method may include receiving recorded audio and video data from the doorbell camera based at least in part on the activating. The method may include sending an alert indicating the detected discrepancy and requesting a confirmation message in response to the sent alert. In some instances, the detected discrepancy may comprise at least one of a change in the power supply level, or a change in a connected Wi-Fi network, or activation of an anti-tamper switch proximate the doorbell camera, or a duplicate signal, or a lack of power, or a combination thereof.

In further embodiments, an apparatus for security and/or automation systems may be described. The apparatus may comprise a processor, memory in electronic communication with the processor, and instructions stored in the memory. The instructions may be executable by the processor to identify a discrepancy at a doorbell camera associated with an automation system, compare the identified discrepancy with an alteration parameter of the doorbell camera, and automatically activate one or more security feature based at least in part on the comparing.

In another embodiment, a non-transitory computer-readable medium storing computer-executable code may be described. The code executable by a processor to identify a discrepancy at a doorbell camera associated with an automation system, compare the identified discrepancy with an alteration parameter of the doorbell camera, and automatically activate one or more security feature based at least in part on the comparing.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Automation systems may comprise one or more devices external to a home. Due to their location, the devices may be more susceptible to theft. To discourage the acquisition of the device, the device and the automation system may be equipped to discourage the illicit acquisition of the device. The device may comprise hardware features to discourage and/or prevent theft. The device may additionally comprise one or more software features to discourage and/or prevent the theft of the device. The features may additionally aid in the recovery of the devices.

The device may be a multitude of devices including security cameras, sensors, doorbells, and the like. The devices may be fixed to a predetermined location and may be connected to a continuous power supply. The devices may also be hybrid devices, or consist of multiple parts. For example, a doorbell device may comprise the typical functions of a doorbell, but may also comprise a security camera and a user interface. In this description, a doorbell camera will be used an exemplary device.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
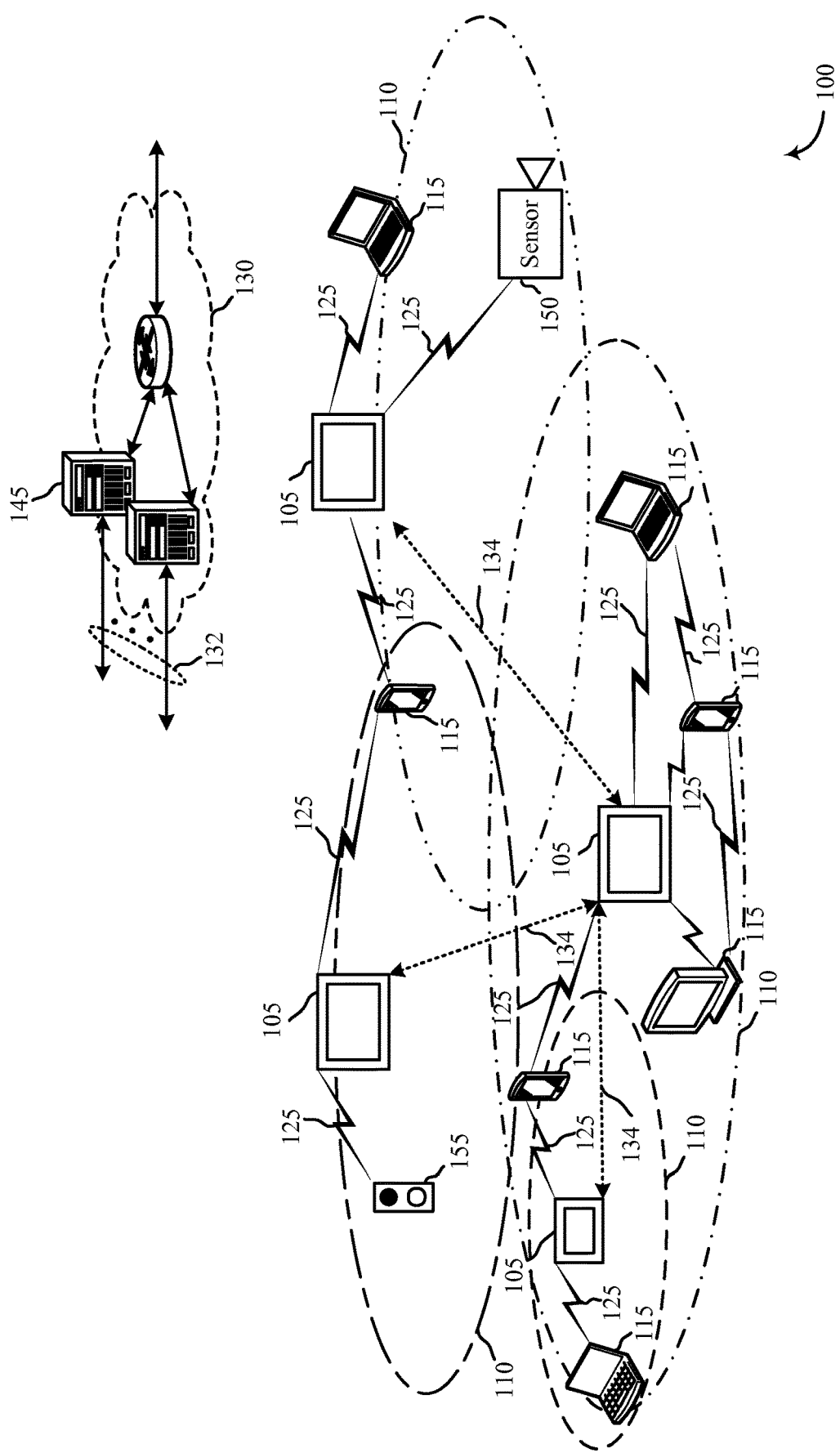
FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include control panels 105, devices 115, a network 130, a doorbell camera 155 and/or sensors 150. The network 130 may provide user authentication, encryption, access authorization, tracking, Internet Protocol (IP) connectivity, and other access, calculation, modification, and/or functions. The control panels 105 may interface with the network 130 through a first set of wired and/or wireless communication links 132 to communicate with one or more remote servers 145. The control panels 105 may perform communication configuration, adjustment, and/or scheduling for communication with the devices 115 and/or the doorbell camera 155, or may operate under the control of a controller. In various examples, the control panels 105 may communicate—either directly or indirectly (e.g., through network 130)—with each other over a second set of wired and/or wireless communication links 134. Control panels 105 may communicate with a back end server (such as the remote servers 145)—directly and/or indirectly—using the first set of one or more communication links 132.

The control panels 105 may wirelessly communicate with the devices 115 and/or doorbell camera 155 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 may be dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The control panels 105 may wirelessly communicate with the sensors 150 via one or more antennas. The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, and/or other inputs that relate to a security and/or an automation system. A device 115 and/or a sensor 150 may be able to communicate through one or more wired and/or wireless connections with various components such as control panels, base stations, and/or network equipment (e.g., servers, wireless communication points, etc.) and/or the like.

The control panels 105 may wirelessly communicate with the doorbell camera 155 via one or more antennas. Multiple doorbell cameras 155 may be dispersed throughout the communications system 100 and each doorbell camera 155 may be proximate an entry to the residence. A doorbell camera 155 may include a doorbell, a camera, a speaker, and/or a microphone. A device 115, sensor 150, and/or doorbell camera 155 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

The doorbell camera 155 may be proximate an entry to a residence. The doorbell camera 155 may comprise self-detecting capabilities which may alert the automation system of potential illicit acts. Additionally and/or alternatively, the automation system may closely track the security and functionality of the doorbell camera 155 to ensure the safety of the doorbell camera 155 and/or the residence. The doorbell camera 155 may be secured to a permanent fixture of a building and/or premise. The doorbell camera 155 may be secured using one or more tamper-proof fasteners. The tamper-proof fasteners may provide the doorbell camera 155 with a layer of physical security due to the their drive design which may prevent the removal of the fastener with ordinary and/or commonplace tools. Instead, the tamper-proof fasteners may require specialty tools to install and remove the fasteners. The tamper-proof fasteners may be standard order fasteners or may be a custom design.

The automation system may track the normal functionalities of the doorbell camera 155. The normal functionalities may be specific to the doorbell camera 155. The automation system may track that the doorbell camera 155 is functioning properly and is located in the correct spot. The automation system may track the functions of the doorbell camera 155 to determine it remains at an entrance to a building and is receiving information regarding people entering the building. The automation system may track that the doorbell camera 155 is connecting to the Wi-Fi associated with the premise and the like.

Figure 2:
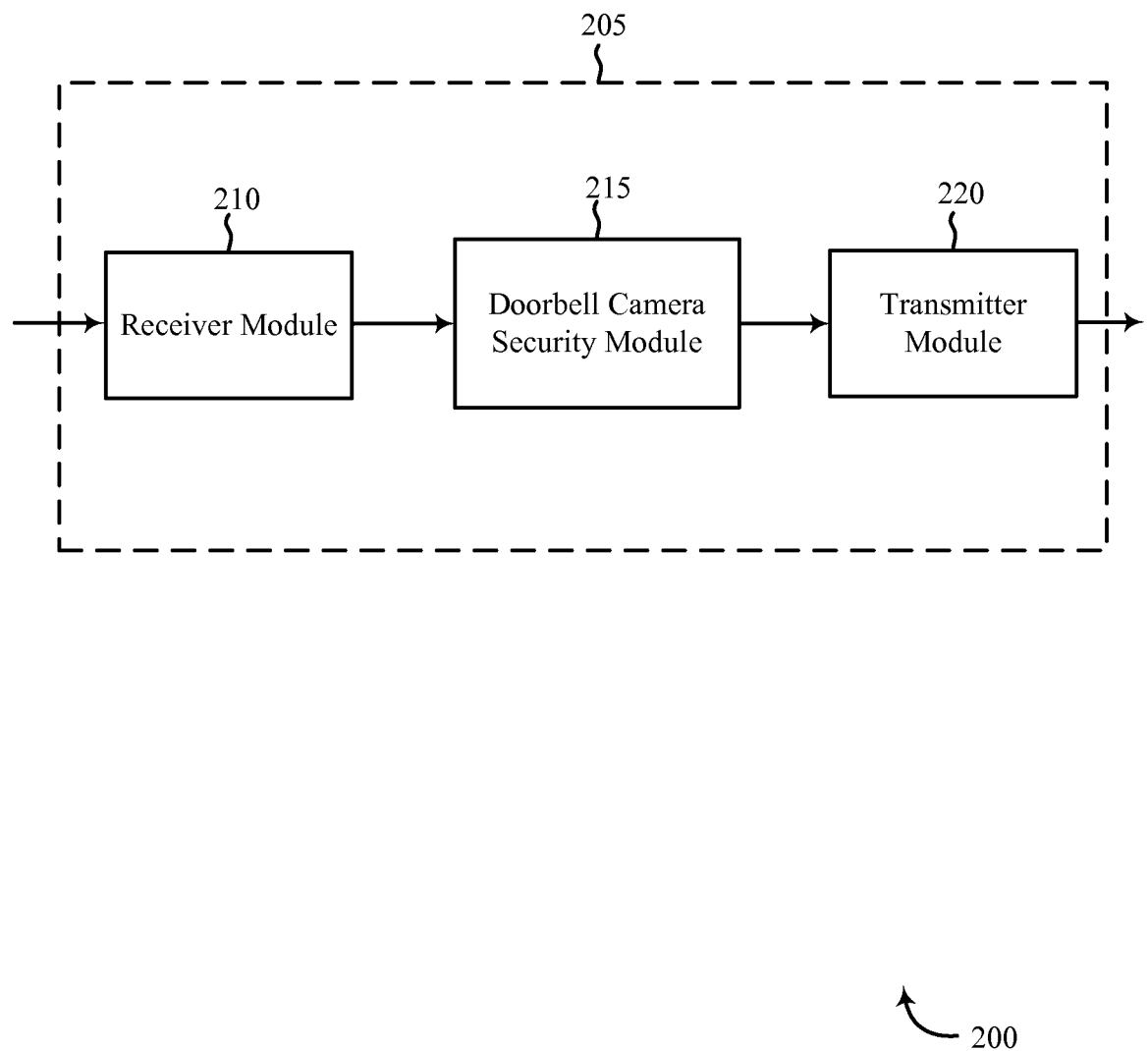
FIG. 2 shows a block diagram of a device relating to a security and/or an automation system, in accordance with various aspects of this disclosure.

FIG. 2 shows a block diagram 200 of a device 205 for use in electronic communication, in accordance with various aspects of this disclosure. The device 205 may be an example of one or more aspects of a control panel 105, a device 115, a remote server 145, and/or a doorbell camera 155 described with reference to FIG. 1. The device 205 may include a receiver module 210, a doorbell camera security module 215, and/or a transmitter module 220. The device 205 may also be or include a processor. Each of these modules may be in communication with each other—directly and/or indirectly.

The components of the device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive information concerning the safety of a doorbell camera (e.g. doorbell camera 155). The information may comprise a location of the doorbell camera, images and/or audio from the doorbell camera, software health, and the like. Information may be passed on to the doorbell camera security module 215, and to other components of the device 205.

The doorbell camera security module 215 may provide a level of assurance that the doorbell camera is properly functioning and in its correct place. The doorbell camera security module 215 may track a location of the doorbell camera to ensure the doorbell camera has not been removed from the residence. If the location of the doorbell camera satisfies a location threshold, the doorbell camera security module 215 may take steps to ensure the doorbell camera cannot be commandeered for a different automation system and/or to recover the doorbell camera. For example, a global positioning system (GPS) device may be proximate the doorbell camera and may be activated. The doorbell camera may additionally have a camera which may be activated to record images and/or sound to determine a location. The doorbell camera may remotely receive a command to activate the camera or may be programmed to activate the camera based on one or more security parameters.

The doorbell camera security module 215 may additionally track one or more parameters of the doorbell camera to ensure its proper functioning. For example, the doorbell camera security module 215 may track the software functionality of the doorbell camera to ensure the doorbell camera was not altered. If an alteration parameter is satisfied or a threshold is exceed, the doorbell camera security module 215 may activate one or more security features. The security features may issue commands to the doorbell camera to activate physical features and/or other features to aid in the recovery of the doorbell camera and/or ensure a person is not illicitly using the doorbell camera to gain access to one or more aspects of the automation system.

The transmitter module 220 may transmit the one or more signals received from other components of the device 205. The transmitter module 220 may transmit a location of the doorbell camera, an information request to the doorbell camera, a security command, and the like. In some examples, the transmitter module 220 may be collocated with the receiver module 210 in a transceiver module.

Figure 3:
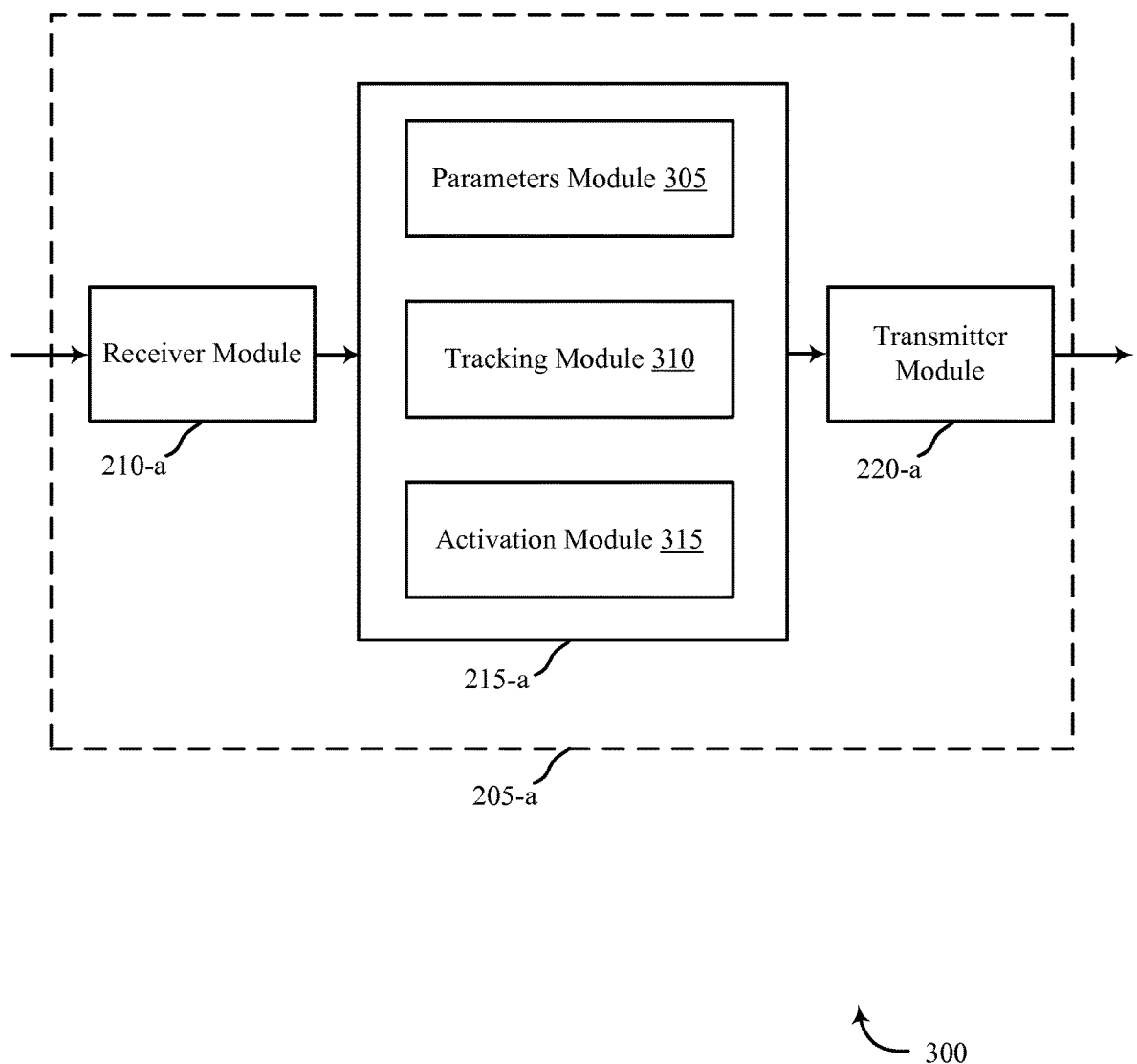
FIG. 3 shows a block diagram of a device relating to a security and/or an automation system, in accordance with various aspects of this disclosure.

FIG. 3 shows a block diagram 300 of a device 205-*a* for use in wireless communication, in accordance with various examples. The device 205-*a* may be an example of one or more aspects of a control panel 105, a device 115, a remote server 145, and/or doorbell camera 155 described with reference to FIG. 1. It may also be an example of a device 205 described with reference to FIG. 2. The device 205-*a* may include a receiver module 210-*a*, a doorbell camera security module 215-*a*, and/or a transmitter module 220-*a*, which may be examples of the corresponding modules of device 205. The device 205-*a* may also include a processor. Each of these components may be in communication with each other. The doorbell camera security module 215-*a* may include a parameters module 305, a tracking module 310, and an activation module 315. The receiver module 210-*a* and the transmitter module 220-*a* may perform the functions of the receiver module 210 and the transmitter module 220, of FIG. 2, respectively.

The components of the device 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The parameters module 305 may allow a user and/or automation system to program one or more alteration parameters of the doorbell camera. The alteration parameters may comprise a location of the doorbell camera, a level of power supply to the doorbell camera, antenna signals, images, and the like. The alteration parameters may be linked to physical features of the doorbell camera. For example, a sensor may detect when a fastener proximate the doorbell camera is altered. The sensor may detect when the fastener is loosened, suggesting the doorbell camera may be in the process of being removed from its mounting location. The doorbell camera may additionally comprise an anti-tamper device which may be activated when the doorbell camera is removed from its location.

The parameters module 305 may program the proper power level to be supplied to the doorbell camera. The proper power supply level may comprise an acceptable range of power and/or may be specifically set once the doorbell camera is properly installed in its functioning location. Additionally, the image alteration parameter may relate to the standard image captured by the doorbell camera and may be programmed once the camera is installed. The image alteration parameter may account for seasonal and/or weather related changes. For example, the image alteration parameter may focus on permanent features it captures such as steps, railings, mailboxes, and the like. External features subject to change may be programmed but not critical. This may include variations for snow and rain. It may additionally comprise changes for seasons such as flowers blooming, leaves on a tree, and the like.

Location parameters may comprise setting an acceptable boundary range for the doorbell camera. This may comprise a location parameter being set to a household or a range surrounding the house. This may enable a user to move a doorbell camera between entry points. It may additionally allow a technician to service the doorbell camera without activating a location-related alarm. The location parameter may be determined using a Wi-Fi network. If the doorbell camera can no longer connect to a Wi-Fi network associated with a home residence, the doorbell camera may have exceeded a location parameter. In other embodiments, a geo-fence may be implemented which may surround the premises. The geo-fence may consist of a series of GPS locations which may define the boundary of a residence and surrounding grounds.

The alteration parameters may additionally track the software of the doorbell camera to ensure unauthorized alterations do not occur. This may comprise running systematic and/or periodic checks of the software system to ensure it complies with proper protocols for the doorbell camera. This may additionally check the number of locations an antenna proximate the doorbell camera is receiving transmissions. If there are numerous locations receiving transmissions, there may be an increased likelihood that the doorbell camera has been jeopardized.

The tracking module 310 may track the various alteration parameters and determine when a parameter has been satisfied and/or exceeded. The tracking module 310 may detect when the doorbell camera may have been compromised. For example, the tracking module 310 may detect when a doorbell camera has been hacked and an unauthorized person is accessing one or more pieces of data concerning the automation system. The doorbell camera may be connecting to a different IP address or Wi-Fi account. The doorbell camera may additionally be acting abnormally. For example, a doorbell camera may allow a person to access a building without express authorization from the automation system. The doorbell camera may be capturing an abnormal view or an abnormal amount of data and storing the data locally and/or transferring the data to a device not associated with the automation system. The tracking module 310 may determine if the doorbell camera has recently undergone a reboot without the prompting of the automation system. The reboot may be necessary to implement software changes to the doorbell camera and may be indicative of a hostile takeover.

In some embodiments, the tracking module 310 may track the location of the doorbell camera and determine when the location of the doorbell camera has exceeded a threshold. The tracking module 310 may run systematic checks on the software of the doorbell camera to ensure compliance with the automation system. The tracking module 310 may additionally track the signals being sent from the doorbell camera. The tracking module 310 may be aware that the doorbell camera should be sending information to a control panel associated with the automation system. In some embodiments, the doorbell camera should only send information to the control panel and the control panel may disseminate information to other portions of the automation system. Therefore, if the tracking module 310 detects a different destination is receiving information from the doorbell camera, the tracking module 310 may initially determine the doorbell camera has been compromised and complete a further analysis to determine if the software of the doorbell camera has been altered.

The tracking module 310 may track the images captured by the doorbell camera and analyze the images according to the parameters module 305. Analyzing the images may include analyzing the stable characteristics of the image captured by the doorbell camera to ensure the camera has not been moved and/or altered. The tracking module 310 may initiate a warning signal and/or an alert based at least in part on the image analysis. For example, if a predetermined portion of the image appears different, the tracking module 310 may initiate a warning signal. If the image appears to be completely altered, the tracking module 310 may initiate an alert to determine the location of the doorbell camera.

The doorbell camera may additionally experience a change in voltage which may not be a direct result of the automation system. For example, a person may attempt to gain access to the workings of the doorbell camera which may require additional power requirements. The tracking module 310 may track fluctuations in the power supply to the doorbell camera. A spike or sudden change in the power supply may indicate the doorbell camera has been compromised. The tracking module 310 may determine when the doorbell camera is no longer connected to the automation system. This may occur by either the doorbell camera failing to connect to the automation system, or the control panel failing to connect to the doorbell camera.

In some embodiments, the tracking module 310 may track the physical sensors proximate the doorbell camera. The tracking module 310 may detect when a fastener is being removed from the doorbell camera, when a cover is being taken off, when the camera has been covered, when a tamper switch has been activated and the like.

The activation module 315 may automatically activate one or more security features based at least in part on information received from the tracking module 310. The activation module 315 may activate a camera of the doorbell camera if the tracking module 310 has determined the doorbell camera has satisfied a location threshold of an alteration parameter. The activation module 315 may collect data associated with the current location of the doorbell camera and attempt to identify a current location of the doorbell camera based at least in part on the collecting. For example, the activation module 315 may receive GPS information from the doorbell camera and attempt to locate the doorbell camera based on the GPS information. If the doorbell camera is activated, the activation module 315 may record audio and visual data from the doorbell camera and, if the device 205-a is the doorbell camera, may send the recorded information to a control panel. If the device 205-a is a control panel, the control panel may receive audio and visual data from the doorbell camera. The activation module 315 may review images captured by the doorbell camera and attempt to ascertain a location and/or a person based on the images. Similarly, the activation module 315 may review audio data to determine a location of the doorbell camera. This may aid in determining the location of the doorbell camera and potentially recovering the doorbell camera. If the doorbell camera was illicitly acquisitioned, the data may aid in prosecuting an individual.

In some embodiments, the activation module 315 may disable one or more features of the doorbell camera. Disabling features of the doorbell camera may prevent a person from utilizing the doorbell camera to its fullest capacity. This may frustrate a potential thief and thwart possible theft of the doorbell camera. Additionally, if the functions of the doorbell camera have been compromised, disabling the features may prevent a third party from receiving information from the doorbell camera. The activation module 315 may then determine when the disabled features are attempting to be accessed. The activation module 315 may identify a location from which the attempt is made and ascertain a location associated with compromising the doorbell camera. For example, the activation module 315 may determine an internet service provider (ISP) address which may link to a location. The location may allow the activation to identify an individual which may have compromised the doorbell camera. The activation module 315 may additionally communicate the ISP address and a physical address to safety personnel such as police, which may track down a potential culprit.

The activation module 315 may additionally send an alert to a server of the automation system. The activation module 315 may send an alert to a user of the automation system. The alert may include information pertaining to the alteration parameter and a detected discrepancy at the doorbell camera. The user may have the ability to respond to the alert. The user may respond with the location of the doorbell camera. For example, the user may have moved the doorbell camera or there may have been a false alarm and the doorbell camera is still in its installed location. The user may also confirm the loss of the doorbell camera. This may result in the automation system fully activating all security parameters and replacing the doorbell camera for the user.

If the activation module 315 has confirmation that the doorbell camera has been compromised, the activation module 315 may take one or more steps to ensure the doorbell camera will not function properly. For example, the activation module 315 may cause the doorbell camera to erase one or more portions of software that control the doorbell camera. The software may be installed on the doorbell camera itself. The activation module 315 may additionally cause the doorbell camera to destroy physical characteristics of the doorbell camera. The activation module 315 may immediately cause the doorbell camera to destroy one or more physical features of the doorbell camera or may cause the doorbell to destroy one or more physical features within a predetermined time period. Destroying one or more features may comprise destroying the entirety of the doorbell camera, causing a circuit to create an electrical malfunction, causing the camera to malfunction, and the like.

Figure 4:
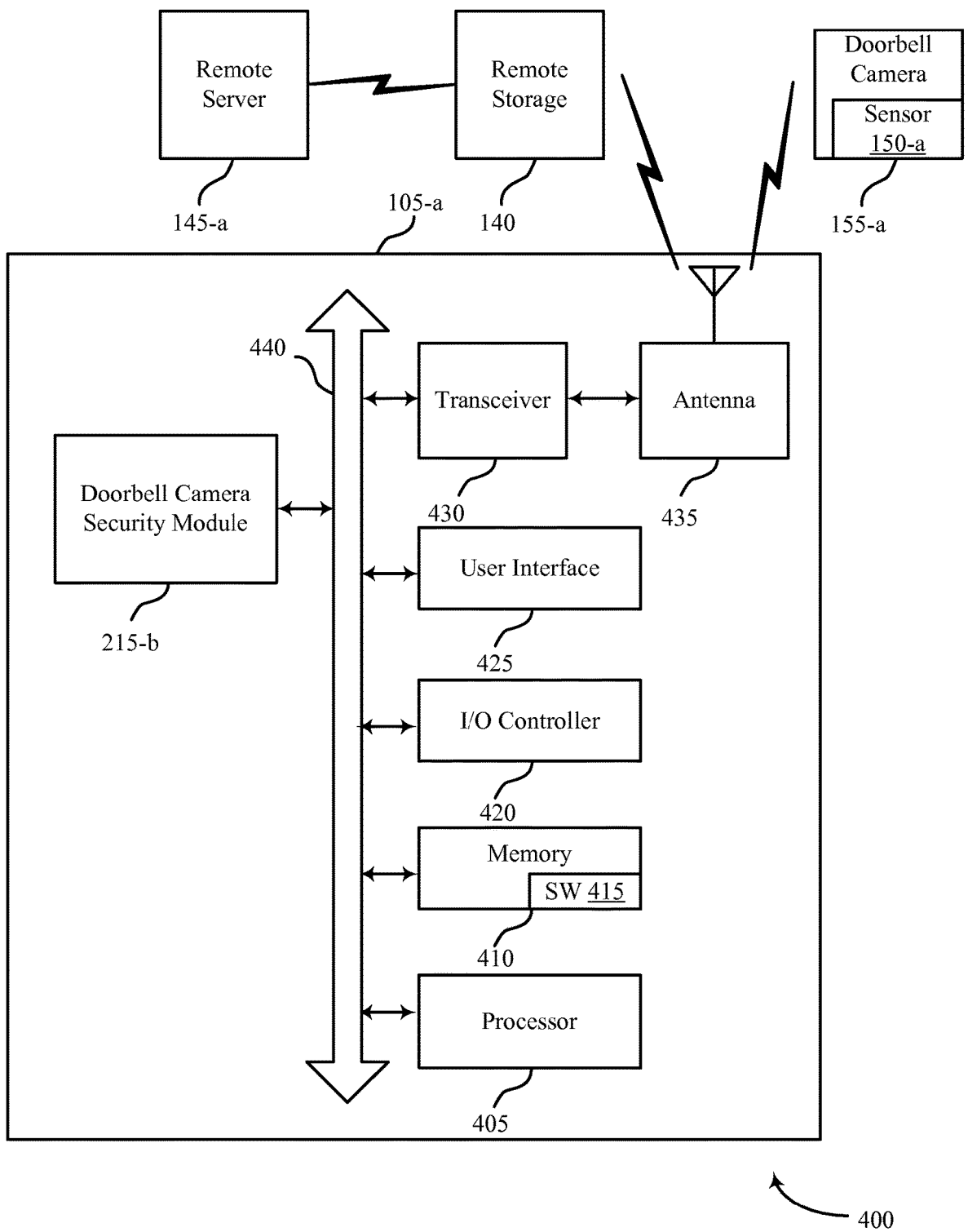
FIG. 4 shows a block diagram relating to a security and/or an automation system, in accordance with various aspects of this disclosure.

FIG. 4 shows a system 400 for use in the security of doorbell camera systems, in accordance with various examples. System 400 may include a control panel 105-a, which may be an example of the control panels 105 of FIG. 1. Control panel 105-a may also be an example of one or more aspects of device 205 and/or 205-a of FIGS. 2 and 3. In some embodiments, aspects of the control panel 105-a may additionally be incorporated into the device 205 and/or 205-a of FIGS. 2 and 3.

Control panel 105-a may also include components for bi-directional voice and data communications including components for transmitting communications and components for receiving communications. For example, control panel 105-a may communicate bi-directionally with one or more of doorbell camera 155-a, one or more sensors 150-a, remote storage 140, device (not shown, e.g. device 115, FIG. 1) and/or remote server 145-a, which may be an example of the remote server of FIG. 1. This bi-directional communication may be direct (e.g., control panel 105-a communicating directly with remote storage 140) or indirect (e.g., control panel 105-a communicating indirectly with remote server 145-a through remote storage 140).

Control panel 105-a may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of doorbell camera 155-a, remote storage 140, and/or remote server 145-a. The transceiver module 430 may include a modem to modulate the packets and provide the modulated packets to the one or more antennas 435 for transmission, and to demodulate packets received from the one or more antenna 435. While a control panel or a control device (e.g., 105-a) may include a single antenna 435, the control panel or the control device may also have multiple antennas 435 capable of concurrently transmitting or receiving multiple wired and/or wireless transmissions. In some embodiments, one element of control panel 105-a (e.g., one or more antennas 435, transceiver module 430, etc.) may provide a direct connection to a remote server 145-a via a direct network link to the Internet via a POP (point of presence). In some embodiments, one element of control panel 105-a (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-a (e.g., motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of control panel 105-a (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., track one or more alteration parameters proximate the doorbell camera 155-a, and/or activate one or more security features based at least in part on the tracking, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, a doorbell camera security module 215-b to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the control panel or control device (e.g., 105-b) may include a single antenna 435, the control panel or control device (e.g., 205-b) may have multiple antennas 435 capable of concurrently transmitting and/or receiving multiple wireless transmissions.

The control panel 105-a may include the doorbell camera security module 215-b, which may perform the functions described above for the doorbell camera security module 215 of device 205 of FIGS. 2 and 3.

Figure 5:
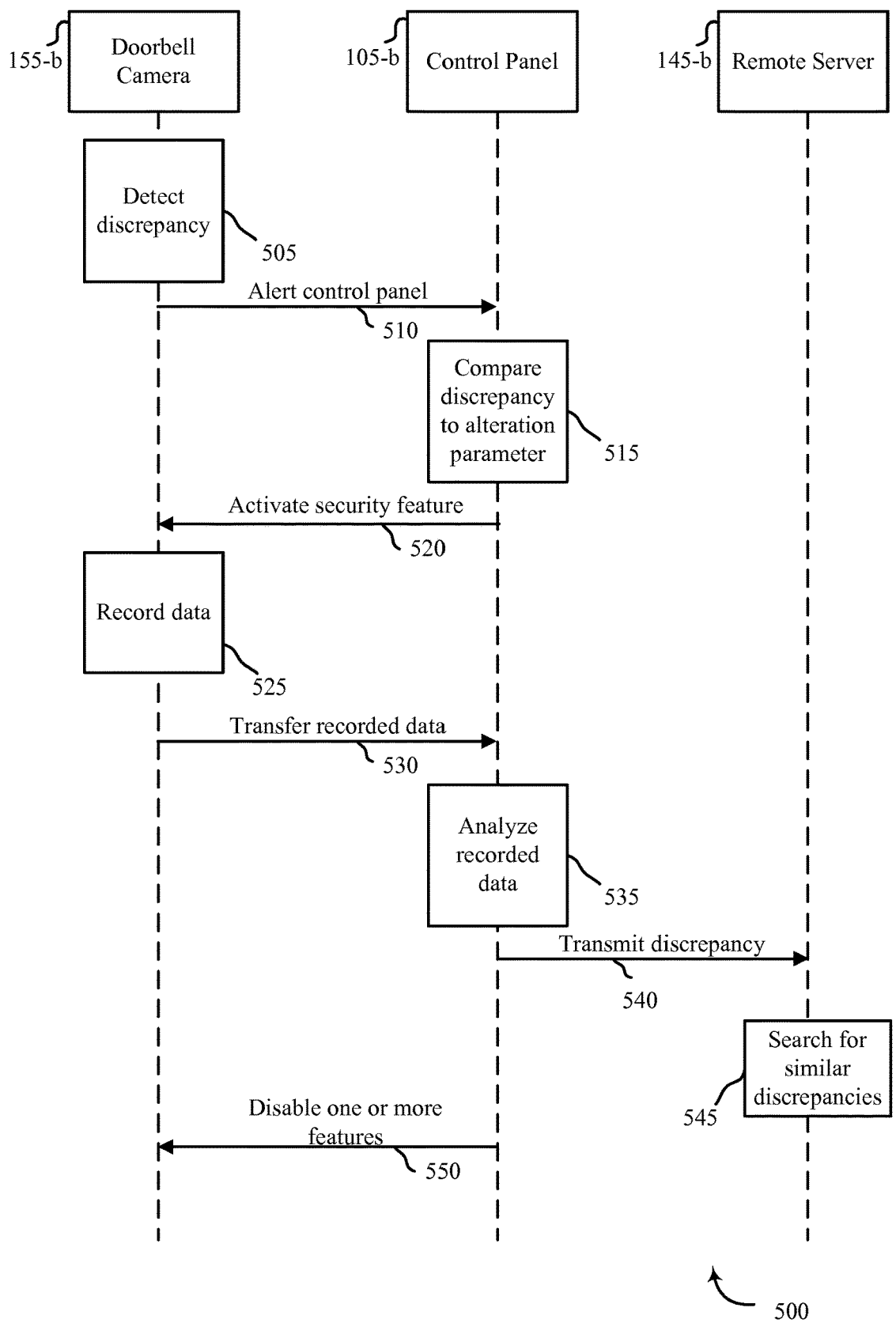
FIG. 5 shows a swim diagram of an apparatus relating to a security and/or an automation system, in accordance with various aspects of this disclosure.

FIG. 5 is one example of a swim diagram relating to security of a doorbell camera 155-b. The doorbell camera 155-b may be one example of the doorbell camera 155 discussed with reference to FIGS. 1 and/or 4. In some embodiments, steps taken relating to the security of the doorbell camera 155-b may occur almost entirely within the confines of the doorbell camera 155-b. In other embodiments, as displayed in FIG. 5, steps taken to relating to the security of the doorbell camera 155-b may occur in conjunction with the doorbell camera 155-b, a control panel 105-b, a remote server 145-b, or some combination thereof.

The doorbell camera 155-b may detect a discrepancy 505 at the doorbell camera. The discrepancy may comprise an alteration in the software programming, a sensor being triggered, motion detection, or the like. The doorbell camera 155-b may alert the control panel 105-b of the discrepancy 510. The control panel 105-b may compare the discrepancy to one or more alteration parameters 515. For example, the control panel 105-b may analyze an image and compare image features to standards features that should be present in an image. The control panel 105-b may determine the location of the doorbell camera 155-b satisfies or exceeds a location threshold for the doorbell camera 155-b. The control panel 105-b may determine the doorbell camera 155-b is being removed based at least in part on information from sensors proximate the doorbell camera 155-b.

In response to the comparing, the control panel 105-b may send a command to activate one or more security features 520 of the doorbell camera 155-b. In response, the doorbell camera 155-b may record data 525 proximate the doorbell camera 155-b. The data may comprise location data, audio and/or visual data, and the like. The doorbell camera 155-b may transfer the recorded data 530 to the control panel 105-b. The control panel 105-b may analyze the recorded data 535 to determine next actions to take. The next actions may comprise transmitting the discrepancy 540 to a remote server 145-b associated with the automation system. The remote server 145-b may search for similar discrepancies 545 at other residential automation systems. The remote server 145-b may determine a series of similar events have taken place in a related residential area which may point to a systematic attempt to illicitly remove and/or alter doorbell cameras. Additionally, the remote server 145-b may store the information in a database for reference purposes. If the control panel 105-b validates the discrepancy, the control panel 105-b may issue a command to disable one or more features 550 of the doorbell camera 155-b. Disabling the features may prevent a person from using the doorbell camera 155-b in another system or from accessing parts of the automation system.

Figure 6:
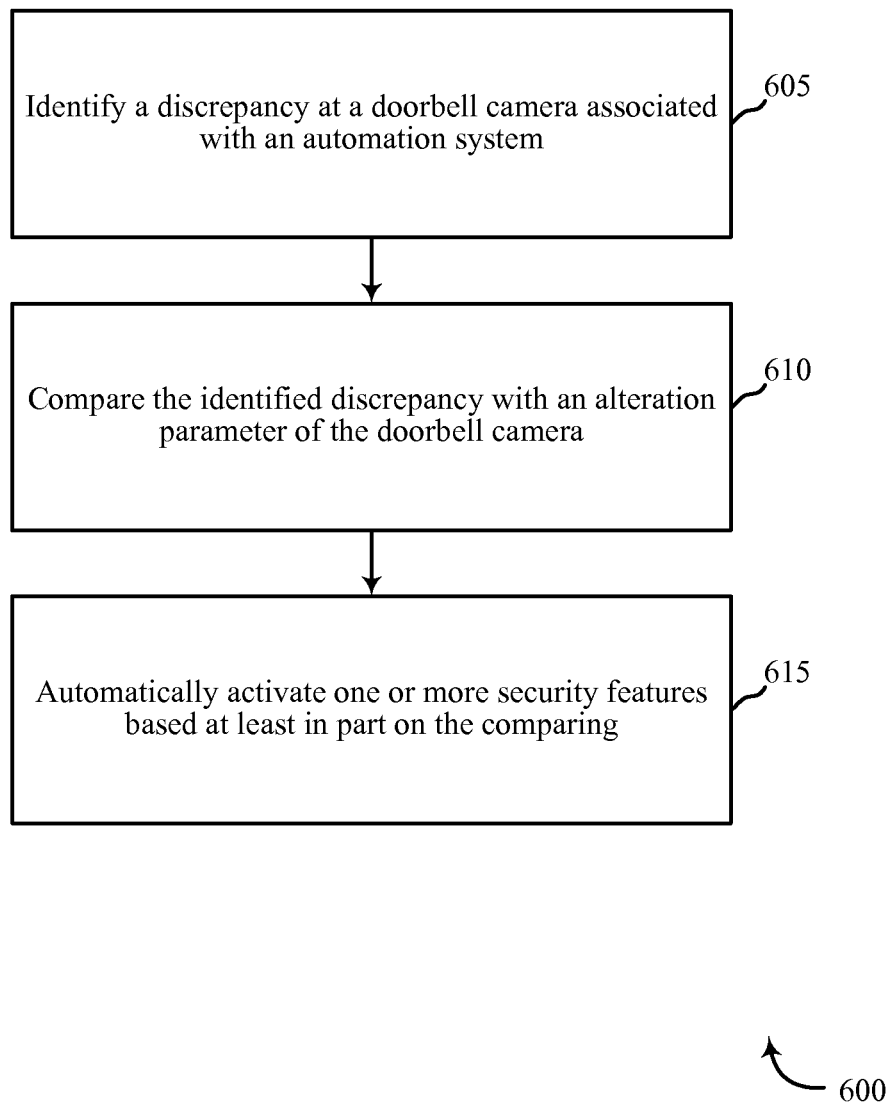
FIG. 6 is a flow chart illustrating an example of a method relating to a security and/or an automation system, in accordance with various aspects of this disclosure.

FIG. 6 is a flow chart illustrating an example of a method 600 for security systems in doorbell camera systems, in accordance with various aspects of the present disclosure. For clarity, the method 600 is described below with reference to aspects of one or more of the device 205 described with reference to FIGS. 2 and 3, and/or aspects of one or more of the doorbell camera 155 and/or control panel 105 described with reference to FIGS. 1 and 4. In some examples, a control panel and/or doorbell camera may execute one or more sets of codes to control the functional elements of the doorbell camera to perform the functions described below. Additionally or alternatively, a remote server may perform one or more of the functions described below using special-purpose hardware.

At block 605, the method 600 may include identifying a discrepancy at a doorbell camera associated with an automation system. The discrepancy may comprise a sensor being triggered. The discrepancy may comprise a change in a Wi-Fi connection. The discrepancy may comprise a change in the view captured by the doorbell camera. In some embodiments, the doorbell camera may sense motion or determine its location has changed. The discrepancy may comprise a change in power supply level. The power supply level may be a set range and the method 600 may sense when an unexpected change has occurred or when the power supply is no longer within the predicated range. In some instances, the change in power supply may comprise a complete lack of power. The method 600 may additionally detect a duplicate signal from the doorbell camera. The duplicate signal may be a signal sent to another destination or may be multiple signals leaving the doorbell camera. The duplicate signal may indicate the software to control the doorbell camera has been compromised and/or altered.

At block 610, the method 600 may include comparing the identified discrepancy with an alteration parameter of the doorbell camera. One or more alterations parameters may comprise thresholds for activating security features. The thresholds may define satisfactory conditions of the doorbell camera. If the thresholds are satisfied or are exceeded, it may indicate a potential security breach at the doorbell camera. The alterations parameters may comprise a range of power supply to the doorbell camera. The alteration parameters may additionally comprise a location threshold for the doorbell camera, and the like.

The operation(s) at block 605 and 610 may be performed using the tracking module 310 described with reference to FIG. 3.

At block 615, the method 600 may include automatically activating one or more security features based at least in part on the comparing. For example, if the comparing determines an alteration parameter has been satisfied and/or exceed, one or more security features may be activated. The security features may comprise disabling one or more functions of the doorbell camera. Then, the disabled features may be tracked to determine if a person attempts to access them. If a person attempts to access the disabled features, a person who illicitly altered the doorbell camera may be found. Additionally, access to the disable features may confirm a person has altered one or more pieces of software that control the doorbell camera.

In some embodiments, activating the one or more security features may additionally comprise erasing at least a portion of software proximate the doorbell camera. By eliminating the software on doorbell camera that may control the doorbell camera, the doorbell camera may become essentially useless without reprogramming it. If the doorbell camera is still connected to the automation system and proximate the residence, a technician may reformat the doorbell camera to its full functioning capabilities. Conversely, if the doorbell camera was illegally acquisitioned, the doorbell camera may no longer function properly. Additionally, activating one or more security features may automatically destroy one or more physical features of the doorbell camera. Destroying the physical features may comprise creating an electrical malfunction which may destroy a portion of a circuit board or other electrical feature. Additionally, the camera, doorbell, and/or audio features may be destroyed.

The operation(s) at block 615 may be performed using the activation module 315 described with reference to FIG. 3.

Thus, the method 600 may provide for security of doorbell camera systems relating to automation/security systems. It should be noted that the method 600 is just one implementation and that the operations of the method 600 may be rearranged or otherwise modified such that other implementations are possible.

Figure 7:
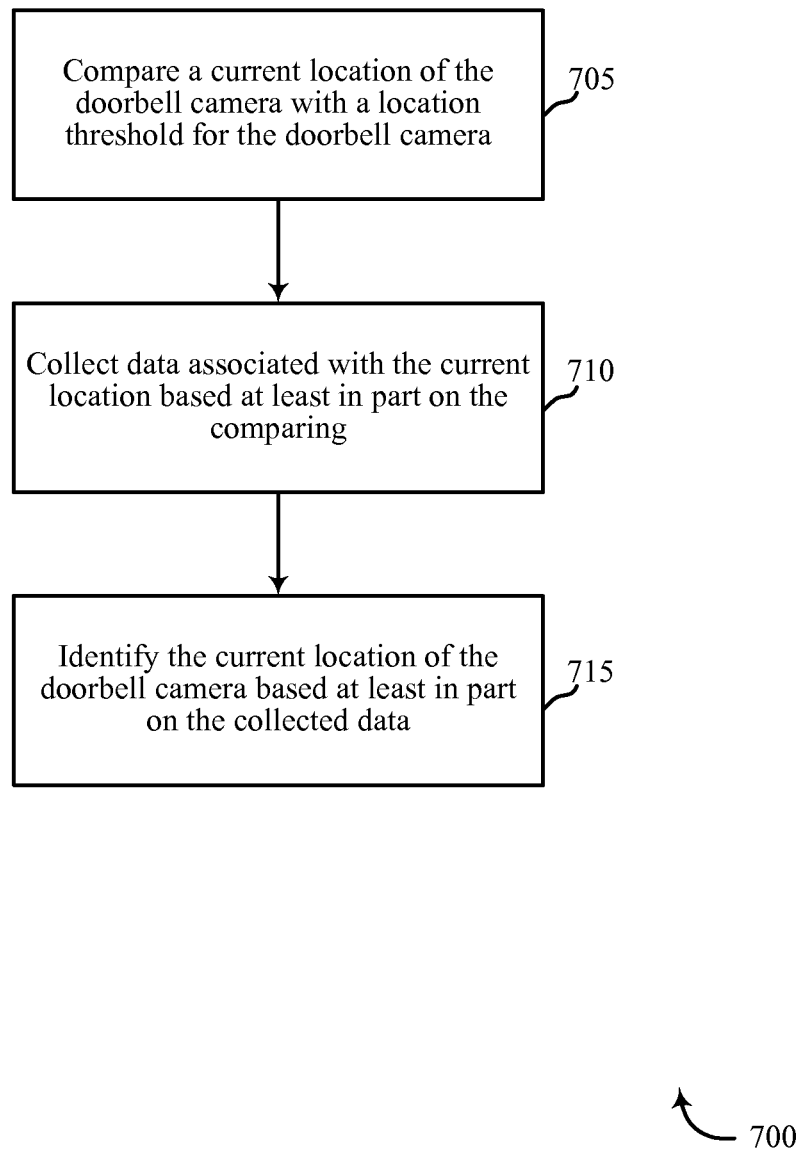
FIG. 7 is a flow chart illustrating an example of a method relating to a security and/or an automation system, in accordance with various aspects of this disclosure.

FIG. 7 is a flow chart illustrating an example of a method 700 for security systems in doorbell camera systems, in accordance with various aspects of the present disclosure. For clarity, the method 700 is described below with reference to aspects of one or more of the device 205 described with reference to FIGS. 2 and 3, and/or aspects of one or more of the doorbell camera 155 and/or control panel 105 described with reference to FIGS. 1 and 4. In some examples, a control panel and/or doorbell camera may execute one or more sets of codes to control the functional elements of the doorbell camera to perform the functions described below. Additionally or alternatively, a remote server may perform one or more of the functions described below using special-purpose hardware.

At block 705, the method 700 may include comparing a current location of the doorbell camera with a location threshold for the doorbell camera. The current location may be determined by use of a GPS unit. The GPS unit may be contained within the doorbell camera and may activate upon motion by the doorbell camera. The GPS unit may automatically transmit location information to a control panel and/or server of an automation system. The GPS unit may additional store location information proximate the doorbell camera. The current location of the doorbell camera may be compared to a location threshold. The location threshold may comprise a series of GPS points which may define a geographic boundary within which the doorbell camera may be considered at a base location. Alternatively, the location threshold may comprise a point home location and an acceptable circular radius within which the doorbell camera may be considered at a base location. Other methods may additionally be used to establish a geographic boundary. By comparing a current location of the doorbell camera to a location threshold for the doorbell camera, it may be determined if the doorbell camera has exceeded and/or surpassed a boundary surrounding a residential automation system.

The operation(s) at block 705 may be performed using the parameters module 305 and/or the tracking module 310 described with reference to FIG. 3.

At block 710, the method 700 may include collecting data associated with the current location of the doorbell camera based at least in part on the comparing. The data may comprise GPS data which may positively identify the location of the doorbell camera. The data may additionally comprise audio, visual, and/or audiovisual data from the doorbell camera. For example, if the current location of the doorbell camera surpassed a location threshold for the doorbell camera, one or more security features may be activated. The security features may comprise activating a GPS feature and/or activating a camera and audio feature. The camera and audio features may capture images and audio data which may aid in identifying a location of the doorbell camera.

At block 715, the method 700 may include identifying the current location of the doorbell camera based at least in part on the collected data. The collected data may comprise GPS coordinates which may positively identify an exact location of the doorbell camera. The collected data may additionally comprise a triangulation suing multiple signals to provide a potential location range of the doorbell camera. In some embodiments, the collected data may comprise a Wi-Fi network which may be used to positively identify a location of the doorbell camera. In still further embodiments, the collected data may comprise images and/or audio data which may allow a system to analyzing and determine a location of the doorbell camera. Analyzing the image may comprise analyzing known image information proximate the residence. Additionally, analyzing the image may comprise positively identifying landmarks and/or other features in an image and/or audio data to positively identify a location of the doorbell camera. If the location of the doorbell camera is known, and the doorbell camera has been misappropriated, the doorbell camera may be recovered and/or a culprit may be identified and/or apprehended.

The operation(s) at block 710 and/or 715 may be performed using the activation module 315 described with reference to FIG. 3.

Thus, the method 700 may provide security systems in doorbell camera systems relating to automation/security systems. It should be noted that the method 700 is just one implementation and that the operations of the method 700 may be rearranged or otherwise modified such that other implementations are possible.

Figure 8:
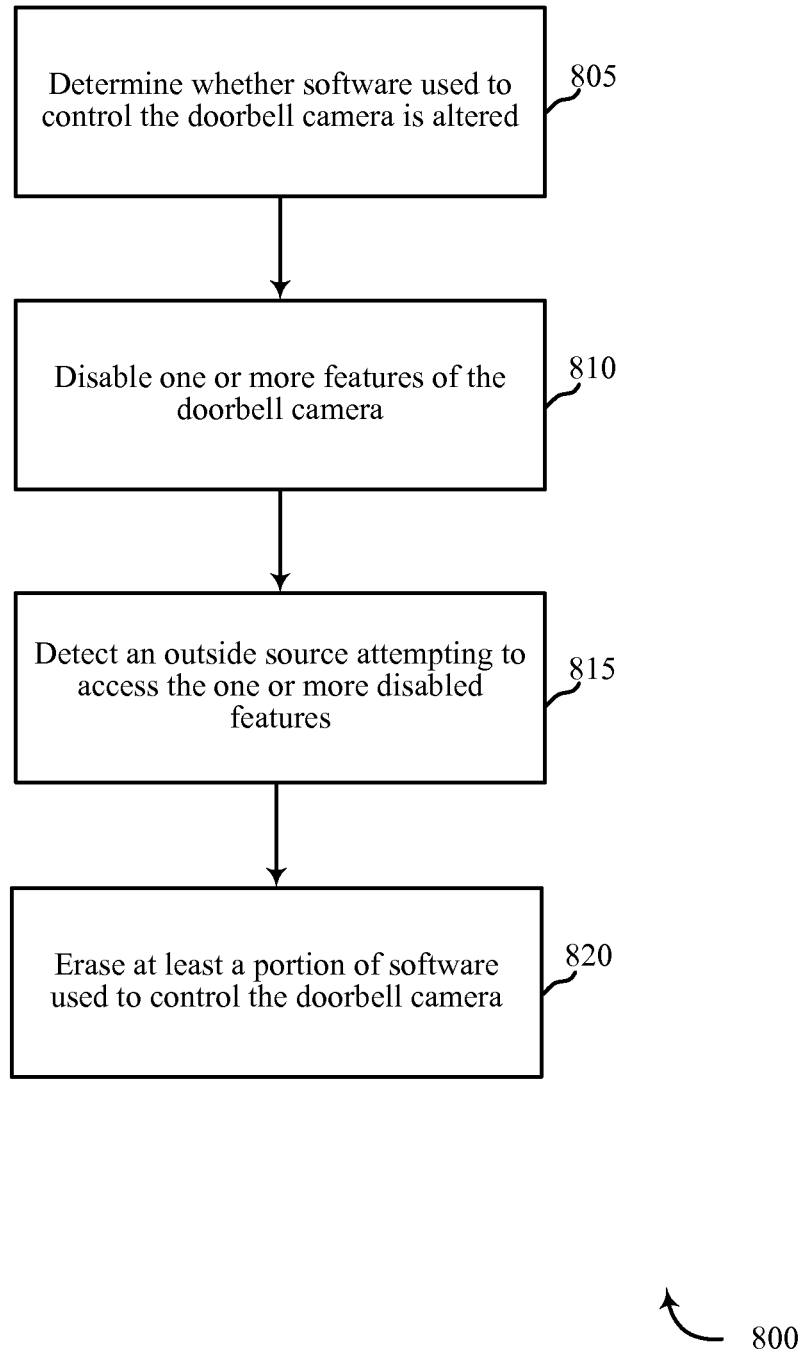
FIG. 8 is a flow chart illustrating an example of a method relating to a security and/or an automation system, in accordance with various aspects of this disclosure.

FIG. 8 is a flow chart illustrating an example of a method 800 for security systems in doorbell camera systems, in accordance with various aspects of the present disclosure. For clarity, the method 800 is described below with reference to aspects of one or more of the device 205 described with reference to FIGS. 2 and 3, and/or aspects of one or more of the doorbell camera 155 and/or control panel 105 described with reference to FIGS. 1 and 4. In some examples, a control panel and/or doorbell camera may execute one or more sets of codes to control the functional elements of the doorbell camera to perform the functions described below. Additionally or alternatively, a remote server may perform one or more of the functions described below using special-purpose hardware.

At block 805, the method 800 may include determining whether software used to control the doorbell camera is altered. For example, the software may be malfunctioning and/or the doorbell camera itself may be malfunctioning. Malfunctioning of the software may comprise not notifying a user of a person proximate an entry to the system.

Additionally, malfunctioning may comprise any function of the doorbell camera not working such as the audio, visual, doorbell functions, or some combination thereof. In some embodiments, the doorbell camera may be sending information to multiple sources. Some of the sources may be unknown and/or not linked to the automation system.

The operation(s) at block 805 may be performed using the tracking module 310 described with reference to FIG. 3.

At block 810, the method 800 may include disabling one or more feature of the doorbell camera. The features may comprise audio, visual, and/or doorbell related features. At block 815, the method 800 may include detecting an outside source attempting to access the one or more disabled features. An attempt to access the features may be indicative of a third party potential altering the software that controls the doorbell camera.

If, at block 815, an outside source has been identified, at block 820, the method 800 may including erasing at least a portion of software used to control the doorbell camera. Erasing the software may prevent a third party from either illicitly using the doorbell camera for their personal and/or attempting to compromise the safety of the occupants of a residence where the doorbell camera is installed. Additionally, erasing at least a portion of the software may prevent proprietary information from being disseminating into competitors or potential competitors control.

The operation(s) at block 810, 815, and 820 may be performed using the activation module 315 described with reference to FIG. 3.

Thus, the method 800 may provide for security systems in doorbell camera systems relating to automation/security systems. It should be noted that the method 800 is just one implementation and that the operations of the method 800 may be rearranged or otherwise modified such that other implementations are possible.

In some examples, aspects from two or more of the methods 600, 700, 800 may be combined and/or separated. It should be noted that the methods 600, 700, 800 are just example implementations, and that the operations of the methods 600, 700, 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems, comprising:
   tracking signals transmitted from a doorbell camera associated with an automation system to a first destination linked to the automation system;
   determining that the doorbell camera is transmitting information associated with the automation system to a second destination different than the first destination, wherein the second destination is unknown;
   identifying a discrepancy at the doorbell camera based at least in part on determining that the doorbell camera is transmitting, to the second destination, the information associated with the automation system;
   comparing the identified discrepancy with an alteration parameter of the doorbell camera; and
   automatically erasing at least a portion of software proximate the doorbell camera rendering the doorbell camera less functional without reprogramming at least in part in response to the comparing.

2. The method of claim 1, further comprising:
   comparing a current location of the doorbell camera with a location threshold for the doorbell camera.

3. The method of claim 2, further comprising:
   collecting data associated with the current location based at least in part on the comparing; and
   identifying the current location of the doorbell camera based at least in part on the collected data.

4. The method of claim 1, wherein comparing the identified discrepancy with the alteration parameter of the doorbell camera further comprises:
   detecting that the doorbell camera is connected to an alternative Wi-Fi network.

5. The method of claim 1, wherein comparing the identified discrepancy with the alteration parameter of the doorbell camera further comprises:
   determining whether the doorbell camera is disconnected from the automation system.

6. The method of claim 1, wherein comparing the identified discrepancy with the alteration parameter of the doorbell camera further comprises:
   determining whether software used to control the doorbell camera is altered.

7. The method of claim 1, wherein automatically activating one or more security features based at least in part on the determining further comprises:
   disabling one or more features of the doorbell camera.

8. The method of claim 7, further comprising:
   detecting an outside source attempting to access the one or more disabled features.

9. The method of claim 1, wherein automatically activating one or more security features based at least in part on the determining further comprises:
   automatically destroying one or more physical features of the doorbell camera after a predetermined time period.

10. The method of claim 1, wherein automatically activating one or more security features based at least in part on the determining further comprises:
    recording audio and video data captured by the doorbell camera; and
    sending the audio and video data to a control panel associated with the automation system.

11. The method of claim 1, further comprising:
    receiving recorded audio and video data from the doorbell camera based at least in part on the activating.

12. The method of claim 1, further comprising:
    sending an alert indicating the identified discrepancy; and
    requesting a confirmation message in response to the sent alert.

13. The method of claim 1, wherein the identified discrepancy comprises at least one of a change in a power supply level, or a change in a connected Wi-Fi network, or activation of an anti-tamper switch proximate the doorbell camera, or a duplicate signal, or a lack of power, or a combination thereof.

14. An apparatus for security and/or automation systems, comprising:

a processor;
memory in electronic communication with the processor; and
instructions stored in the memory, the instructions being executable by the processor to:
track signals transmitted from a doorbell camera associated with an automation system to a first destination linked to the automation system;
determine that the doorbell camera is transmitting information associated with the automation system to a second destination different than the first destination, wherein the second destination is unknown;
identify a discrepancy at the doorbell camera based at least in part on determining that the doorbell camera is transmitting, to the second destination, the information associated with the automation system;
compare the identified discrepancy with an alteration parameter of the doorbell camera; and
automatically erase at least a portion of software proximate the doorbell camera rendering the doorbell camera less functional without reprogramming at least in part in response to the comparing.

15. The apparatus of claim 14, wherein the instructions are further executable by the processor to:
compare a current location of the doorbell camera with a location threshold for the doorbell camera.

16. The apparatus of claim 15, wherein the instructions are further executable by the processor to:
collect data associated with the current location based at least in part on the comparing; and
identifying the current location of the doorbell camera based at least in part on the collected data.

17. A non-transitory computer-readable medium storing computer-executable code, the code executable by a processor to:
track signals transmitted from a doorbell camera associated with an automation system to a first destination linked to the automation system;
determine that the doorbell camera is transmitting information associated with the automation system to a second destination different than the first destination, wherein the second destination is unknown;
identify a discrepancy at the doorbell camera based at least in part on determining that the doorbell camera is transmitting, to the second destination, the information associated with the automation system;
compare the identified discrepancy with an alteration parameter of the doorbell camera; and
automatically erase at least a portion of software proximate the doorbell camera rendering the doorbell camera less functional without reprogramming at least in part in response to the comparing.

18. The apparatus of claim 17, wherein the code is further executable by the processor to:
compare a current location of the doorbell camera with a location threshold for the doorbell camera.

19. The apparatus of claim 18, wherein the code is further executable by the processor to:
collect data associated with the current location based at least in part on the comparing; and
identifying the current location of the doorbell camera based at least in part on the collected data.

* * * * *